United States Patent
Ray et al.

(10) Patent No.: US 11,671,592 B2
(45) Date of Patent: Jun. 6, 2023

(54) POSITION-DEPENDENT INTRA-PREDICTION COMBINATION FOR ANGULAR INTRA-PREDICTION MODES FOR VIDEO CODING

(71) Applicant: QUALCOMM Incorporated, San Diego, CA (US)

(72) Inventors: Bappaditya Ray, San Diego, CA (US); Geert Van der Auwera, Del Mar, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 17/115,455

(22) Filed: Dec. 8, 2020

(65) Prior Publication Data

US 2021/0176465 A1   Jun. 10, 2021

Related U.S. Application Data

(60) Provisional application No. 62/989,316, filed on Mar. 13, 2020, provisional application No. 62/945,725, filed on Dec. 9, 2019.

(51) Int. Cl.
*H04N 19/11* (2014.01)
*H04N 19/159* (2014.01)
(Continued)

(52) U.S. Cl.
CPC ........... *H04N 19/11* (2014.11); *H04N 19/105* (2014.11); *H04N 19/132* (2014.11);
(Continued)

(58) Field of Classification Search
CPC .... H04N 19/105; H04N 19/11; H04N 19/159; H04N 19/186; H04N 19/593; H04N 19/70
See application file for complete search history.

(56) References Cited

U.S. PATENT DOCUMENTS

2017/0094285 A1* 3/2017 Said ................ H04N 19/593
2017/0353730 A1* 12/2017 Liu ................. H04N 19/159
(Continued)

FOREIGN PATENT DOCUMENTS

WO   2018221631 A1   12/2018
WO   2019165343 A1   8/2019
(Continued)

OTHER PUBLICATIONS

"Recent Advances in Intra Prediction for the Emerging H.266/VVC Video Coding Standard"— Filippov et al., 2019 International Multi-Conference on Engineering, Computer and Information Sciences; Date of Conference: Oct. 21-27, 2019. (Year: 2019).*
(Continued)

*Primary Examiner* — Mainul Hasan
(74) *Attorney, Agent, or Firm* — Shumaker & Sieffert, P.A.

(57) ABSTRACT

An example device for decoding video data includes a memory configured to store video data; and one or more processors implemented in circuitry and configured to: generate an intra-prediction block for a current block of video data using an angular intra-prediction mode, the angular intra-prediction mode being an upper-right angular intra-prediction mode or a lower-left angular intra-prediction mode; determine a prediction direction of the angular intra-prediction mode; for at least one sample of the intra-prediction block for the current block: calculate a gradient term for the at least one sample along the prediction direction; and combine a value of an intra-predicted sample of the
(Continued)

intra-prediction block at a position of the at least one sample of the intra-prediction block with the gradient term to produce a value of the at least one sample of the intra-prediction block; and decode the current block using the intra-prediction block.

29 Claims, 12 Drawing Sheets

(51) Int. Cl.
  *H04N 19/132* (2014.01)
  *H04N 19/105* (2014.01)
  *H04N 19/186* (2014.01)
  *H04N 19/176* (2014.01)

(52) U.S. Cl.
  CPC ......... *H04N 19/159* (2014.11); *H04N 19/176* (2014.11); *H04N 19/186* (2014.11)

(56) References Cited

U.S. PATENT DOCUMENTS

| | | | | |
|---|---|---|---|---|
| 2018/0176587 | A1* | 6/2018 | Panusopone | H04N 19/63 |
| 2019/0306513 | A1* | 10/2019 | Van der Auwera | H04N 19/11 |
| 2020/0396470 | A1* | 12/2020 | Zhao | H04N 19/159 |
| 2021/0152820 | A1* | 5/2021 | Zhao | H04N 19/176 |
| 2021/0344931 | A1* | 11/2021 | Filippov | H04N 19/105 |
| 2022/0094912 | A1* | 3/2022 | Lee | H04N 19/176 |

FOREIGN PATENT DOCUMENTS

| | | | | |
|---|---|---|---|---|
| WO | WO-2019165343 | A1 * | 8/2019 | H04N 19/105 |
| WO | WO-2021027925 | A1 * | 2/2021 | H04N 19/11 |

OTHER PUBLICATIONS

"Recent advances in video coding beyond the HEVC standard"—Xiaozhong Xu and Shan Liu; dx.doi.org/10.1017/ATSIP.2019.11; Publication Date: Jun. 25, 2019. (Year: 2019).*
Bossen F., et al., "JVET Common Test Conditions and Software Reference Configurations for SDR Video", Joint Video Experts Team (JVET) of ITU-T SG 16 WP 3 and ISO/IEC JTC 1/SC 29/WG 11, 14th Meeting, Geneva, CH, Mar. 19-27, 2019, JVET-N1010-v1, pp. 1-6.
Bossen F., "On General Intra Sample Prediction", JVET-O0364-v2, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-19.
Bross B., et al., "Versatile Video Coding (Draft 7)", Joint Video Experts Team (JVET) of ITU-T SG 16 WP 3 and ISO/EC JTC 1/SC 29/WG 11, JVET-P2001-vE, 16th Meeting, Geneva, CH, Oct. 1-11, 2019, 494 pages.
Choi K., et al., "Text of ISO/IEC CD 23094-1, Essential Video Coding", Coding of Moving Pictures and Audio, (Motion Picture Expert Group or ISO/IEC JTC1/SC29/WG11), No. N18568, Gothenburg, Sweden, Jul. 22, 2019, XP030221847, 292 Pages, Retrieved from the Internet: URL:http://phenix.int-evry.fr/mpeg/doc_end_user/documents/127_Gothenburg/wg11/w18568.zip w18568.docx [retrieved on Jul. 28, 2019] Sections 7.3.2.1, 7.3.2.2, 7.3.4.
ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.
Kotra A.M., et al., "Non-CE5: Chroma QP Derivation Fix for Deblocking Filter (Combination of JVET-P0105 and JVET-P0539)", JVET-P1001-v1, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-7.
Ray B., et al., "Unified PDPC for Angular Intra Modes", JVET-Q0391-v3, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-7.
Xu J., et al., "Non-CE5: Chroma QP Derivation Fix for Deblocking Filter (Combination of JVET-P0105 and JVET-P0539)", JVET-P1002, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-7.
Drugeon (Panasonic) V: "CE3-Related: Disabling PDPC Based on Availability of Reference Samples", 13. JVET Meeting; Jan. 9, 2019-Jan. 18, 2019; Marrakech; (The Joint Video Exploration Team of ISO/IEC JTC1/SC29/WG11 and ITU-T SG.16), No. JVET-M0358, Jan. 2, 2019 (Jan. 2, 2019), 7 Pages, XP030200293, Retrieved from the Internet: URL: http://phenix.int-evry.fr/jvet/doc_end_user/documents/13_Marrakech/wg11/JVET-M0358-v1.zip JVET-M03S8.docx [retrieved on Jan. 2, 2019] Abstract, Sections 2, 5, 6.
International Search Report and Written Opinion—PCT/US2020/064041—ISA/EPO—dated Apr. 12, 2021—16 pp.

* cited by examiner

FIG. 4

$\log_2(\text{nTbH})$

1 ←——→ 6

Mode index (51 → 80):

| -6 | -5 | -4 | -3 | -2 | -1 |
|----|----|----|----|----|----|
| -5 | -4 | -3 | -2 | -1 | 0 |
| -4 | -3 | -2 | -1 | 0 | 1 |
| -4 | -3 | -2 | -1 | 0 | 1 |
| -3 | -2 | -1 | 0 | 1 | 2 |
| -3 | -2 | -1 | 0 | 1 | 2 |
| -3 | -2 | -1 | 0 | 1 | 2 |
| -2 | -1 | 0 | 1 | 2 | 2 |
| -2 | -1 | 0 | 1 | 2 | 2 |
| -2 | -1 | 0 | 1 | 2 | 2 |
| -2 | -1 | 0 | 1 | 2 | 2 |
| -2 | -1 | 0 | 1 | 2 | 2 |
| -2 | -1 | 0 | 1 | 2 | 2 |
| -1 | 0 | 1 | 2 | 2 | 2 |
| -1 | 0 | 1 | 2 | 2 | 2 |
| -1 | 0 | 1 | 2 | 2 | 2 |
| -1 | 0 | 1 | 2 | 2 | 2 |
| -1 | 0 | 1 | 2 | 2 | 2 |
| -1 | 0 | 1 | 2 | 2 | 2 |
| 0 | 1 | 2 | 2 | 2 | 2 |
| 0 | 1 | 2 | 2 | 2 | 2 |
| 0 | 1 | 2 | 2 | 2 | 2 |
| 0 | 1 | 2 | 2 | 2 | 2 |
| 0 | 1 | 2 | 2 | 2 | 2 |
| 1 | 2 | 2 | 2 | 2 | 2 |
| 1 | 2 | 2 | 2 | 2 | 2 |
| 1 | 2 | 2 | 2 | 2 | 2 |
| 2 | 2 | 2 | 2 | 2 | 2 |
| 2 | 2 | 2 | 2 | 2 | 2 |
| 2 | 2 | 2 | 2 | 2 | 2 |

— 30

POSITION-DEPENDENT INTRA-PREDICTION COMBINATION FOR ANGULAR INTRA-PREDICTION MODES FOR VIDEO CODING

This application claims the benefit of U.S. Provisional Application No. 62/945,725 filed Dec. 9, 2019, and U.S. Provisional Application No. 62/989,316, filed Mar. 13, 2020, the entire contents of each of which are incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for performing position-dependent intra-prediction combination (PDPC) for angular intra-prediction modes. In PDPC, a video coder (encoder or decoder) generally predicts samples of a prediction block using samples of a primary boundary, then uses samples of a secondary (orthogonal) boundary to modify the predicted samples. For instance, if the primary boundary is an upper boundary of a current block, the video coder may use samples of a left boundary of the current block as the secondary boundary. Likewise, if the primary boundary is the left boundary, the video coder may use the upper boundary as the secondary boundary. In some instances, samples of the secondary boundary may not be available, e.g., due to an angle of an intra-prediction direction for the current block. Conventionally, PDPC is disabled in these scenarios. However, according to the techniques of this disclosure, the video coder may perform gradient PDPC, in which case the video coder may calculate a gradient term for a sample and use the gradient term to produce a value of the at least one sample of the intra-prediction block, instead of an actual sample of the secondary boundary.

In one example, a method of decoding video data includes generating an intra-prediction block for a current block of video data using an angular intra-prediction mode, the angular intra-prediction mode being an upper-right angular intra-prediction mode or a lower-left angular intra-prediction mode; determining a prediction direction of the angular intra-prediction mode; for at least one sample of the intra-prediction block for the current block: calculating a gradient term for the at least one sample along the prediction direction; and combining a value of an intra-predicted sample of the intra-prediction block at a position of the at least one sample of the intra-prediction block with the gradient term to produce a value of the at least one sample of the intra-prediction block; and decoding the current block using the intra-prediction block.

In another example, a device for decoding video data includes a memory configured to store video data; and one or more processors implemented in circuitry and configured to: generate an intra-prediction block for a current block of video data using an angular intra-prediction mode, the angular intra-prediction mode being an upper-right angular intra-prediction mode or a lower-left angular intra-prediction mode; determine a prediction direction of the angular intra-prediction mode; for at least one sample of the intra-prediction block for the current block: calculate a gradient term for the at least one sample along the prediction direction; and combine a value of an intra-predicted sample of the intra-prediction block at a position of the at least one sample of the intra-prediction block with the gradient term to produce a value of the at least one sample of the intra-prediction block; and decode the current block using the intra-prediction block.

In another example, a device for decoding video data includes means for generating an intra-prediction block for a current block of video data using an angular intra-prediction mode, the angular intra-prediction mode being an upper-right angular intra-prediction mode or a lower-left angular intra-prediction mode; means for determining a prediction direction of the angular intra-prediction mode; means for calculating a gradient term for the at least one sample along the prediction direction for at least one sample of the intra-prediction block for the current block; means for combining a value of an intra-predicted sample of the intra-prediction block at a position of the at least one sample of the intra-prediction block with the gradient term to produce a value of the at least one sample of the intra-prediction block for the at least one sample of the intra-prediction block for the current block; and means for decoding the current block using the intra-prediction block.

In another example, a computer-readable storage medium has stored thereon instructions that, when executed, cause a processor to generate an intra-prediction block for a current block of video data using an angular intra-prediction mode, the angular intra-prediction mode being an upper-right angular intra-prediction mode or a lower-left angular intra-prediction mode; determine a prediction direction of the angular intra-prediction mode; for at least one sample of the intra-prediction block for the current block: calculate a gradient term for the at least one sample along the prediction direction; and combine a value of an intra-predicted sample of the intra-prediction block at a position of the at least one sample of the intra-prediction block with the gradient term to produce a value of the at least one sample of the intra-prediction block; and decode the current block using the intra-prediction block.

The details of one or more examples are set forth in the accompanying drawings and the description below. Other features, objects, and advantages will be apparent from the description, drawings, and claims.

BRIEF DESCRIPTION OF DRAWINGS

FIG. 4 is a conceptual diagram illustrating nScale values as a function of a height of a transform block (nTbH) and a mode number that may be used when performing the techniques of this disclosure.

DETAILED DESCRIPTION

Video coding standards include ITU-T H.261, ISO/IEC MPEG-1 Visual, ITU-T H.262 or ISO/IEC MPEG-2 Visual, ITU-T H.263, ISO/IEC MPEG-4 Visual (MPEG-4 Part 2), ITU-T H.264 (also known as ISO/IEC MPEG-4 AVC), including its Scalable Video Coding (SVC) and Multiview Video Coding (MVC) extensions, and ITU-T H.265 (also known as ISO/IEC MPEG-4 HEVC (High Efficiency Video Coding)) with its extensions. During the April 2018 meeting of the Joint Video Experts Team (JVET), the Versatile Video Coding (VVC) standardization activity (also known as ITU-T H.266) began, with evaluation of video compression technologies submitted to a Call for Proposals. The techniques of this disclosure may be applied to other video coding standards, such as Essential Video Coding (EVC), "Text of ISO/IEC CD 23094-1, Essential Video Coding," MPEG-5, ISO/IEC CD 23094-1, Jul. 22, 2019, available at mpeg.chiariglione.org/standards/mpeg-5/essential-video-coding/text-isoiec-cd-23094-1-essential-video-coding.

Figure 1:
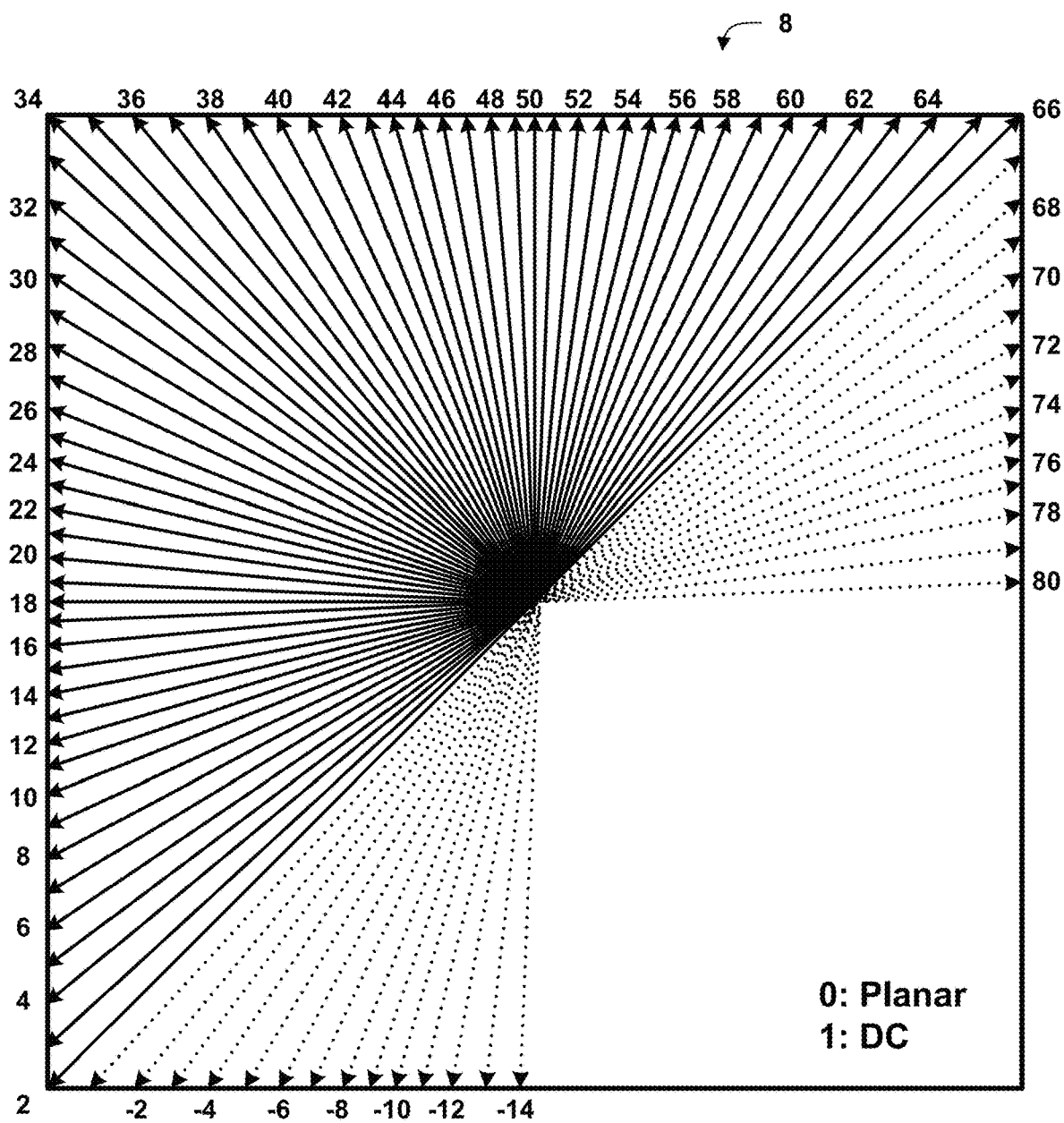
FIG. 1 is a conceptual diagram illustrating example intra-prediction modes that may be used when performing the techniques of this disclosure.

FIG. 1 is a conceptual diagram illustrating example intra-prediction modes that may be used when performing the techniques of this disclosure. The modes of FIG. 1 correspond to an example of modes in Versatile Video Coding (VVC) Test Model (VTM) 7.0. To capture the arbitrary edge directions presented in natural video, the number of directional intra modes in VTM5 is extended from 33, as used in HEVC, to 65. The new directional modes in VVC are depicted in graph 8 of FIG. 1, and the planar and DC modes remain the same as in HEVC. These denser directional intra-prediction modes apply for all block sizes and for both luma and chroma intra-predictions. Such is explained in J. Chen, Y. Ye, S. Kim, "Algorithm description for Versatile Video Coding and Test Model 7 (VTM5)," 16$^{th}$ JVET Meeting, Geneva, CH, October 2019, JVET-P1002.

In VVC, position-dependent intra-prediction combination (PDPC) is an intra-prediction method applied to a current block (e.g., a luma or chroma component), by which a video coder (encoder or decoder) combines an original intra-prediction signal with boundary reference samples (which may be unfiltered or filtered) to generate a final prediction signal for the current block. According to VVC, the video coder applies PDPC to the following intra modes without signaling: planar, DC, horizontal, vertical, and angular modes with positive angles (modes having mode number less than 18 or greater than 50). Such is further explained in B. Bross, J. Chen, S. Liu, "Versatile Video Coding (Draft 7)," 16$^{th}$ JVET Meeting, Geneva, CH, March 2019, JVET-P1001.

Figure 2:
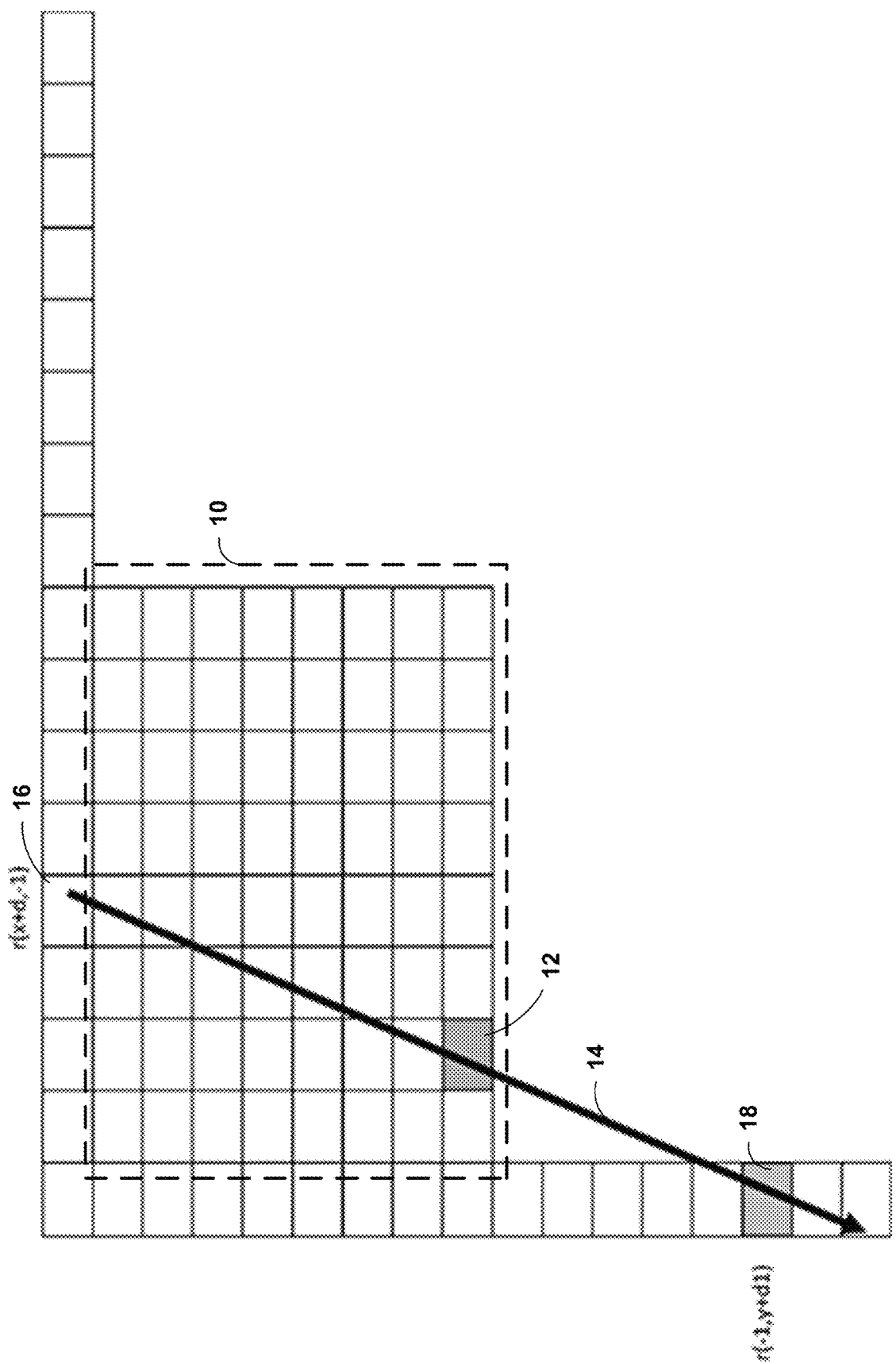
FIG. 2 is a conceptual diagram illustrating position-dependent intra-prediction combination (PDPC) for an intra-prediction mode for an nScale value greater than or equal to zero that may be used when performing the techniques of this disclosure.

FIG. 2 is a conceptual diagram illustrating position-dependent intra-prediction combination (PDPC) for an intra-prediction mode for an nScale value greater than or equal to zero that may be used when performing the techniques of this disclosure. In particular, FIG. 2 illustrates a current block 10 including intra-prediction sample 12. Intra-prediction sample 12 is at position (x,y) in this example, where an upper-left intra-prediction sample of current block 10 is at position (0,0). As shown in FIG. 2, for angular intra-prediction modes, for a given intra-prediction direction (indicated by arrow 14), reference pixel 16 (at position r(x+d, −1) in FIG. 2) for intra-prediction sample 12 is derived from the top reference line (i.e., the line of samples immediately above current block 10). For PDPC, the diagonally opposite reference pixel is reference pixel 18 (at position r(−1,y+d1) in FIG. 2) along the prediction direction for the prediction of pixels at (x,y) position that is used for the prediction combinations. However, depending on the coding unit (CU) dimension and prediction direction, the diagonally opposite reference pixels may not necessarily be available. Such unavailable reference pixels may be referred to as being outside of "PDPC range." According to conventional VVC, PDPC cannot be applied in such cases.

Figure 3:
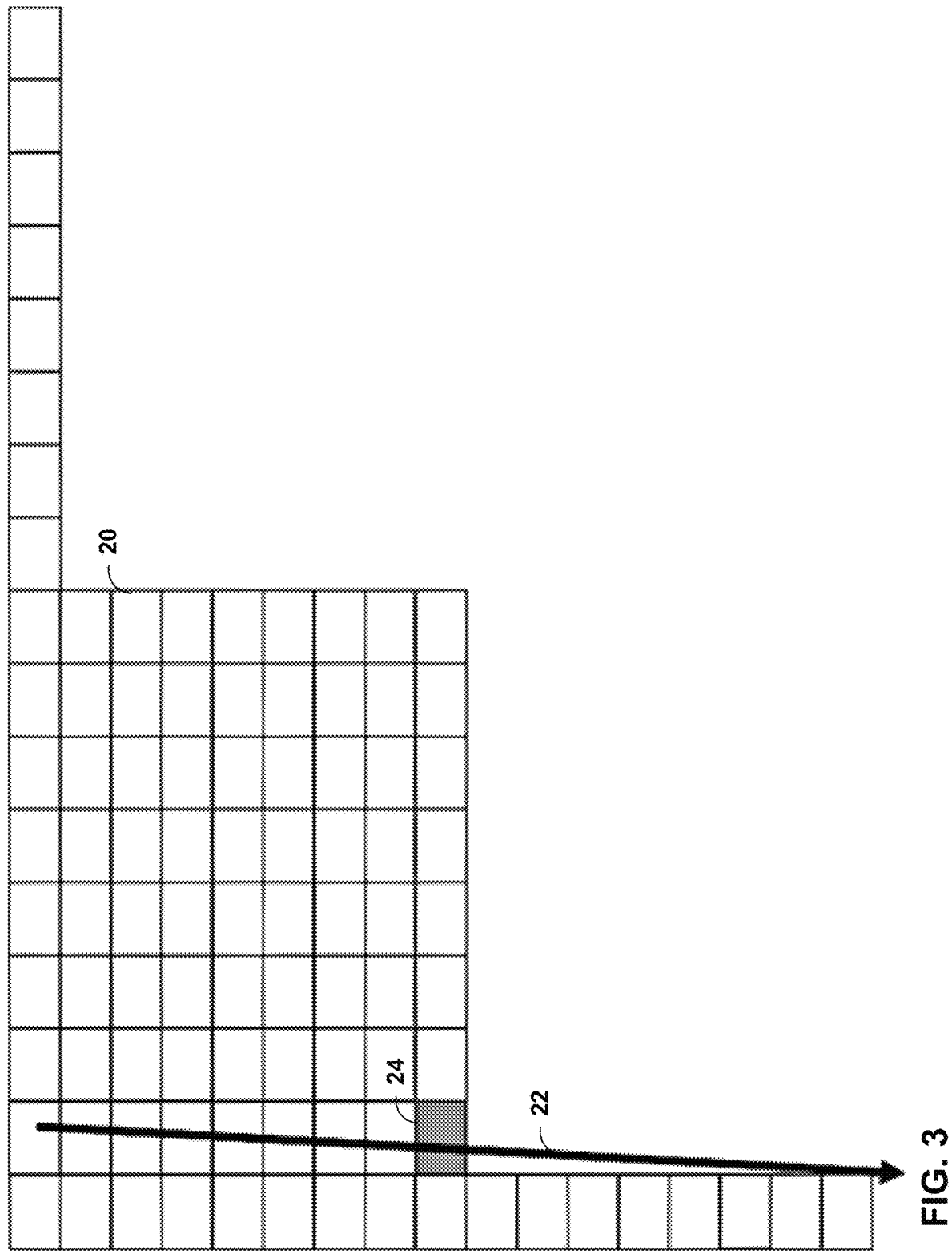
FIG. 3 is a conceptual diagram illustrating an example in which an nScale value for a block indicates that position-dependent intra-prediction combination (PDPC) is not to be applied to the block that may be used when performing the techniques of this disclosure.

FIG. 3 is a conceptual diagram illustrating a scenario in which an nScale value for block 20 indicates that position-dependent intra-prediction combination (PDPC) is not to be applied to block 20, which may be used when performing the techniques of this disclosure. In VTM-7.0, "PDPC range" is not checked explicitly for every pixel. Instead, a video coder modifies the factor "nScale" to be derived from the prediction direction (invAngle) and block dimension, which automatically specifies the "PDPC range" or the region where PDPC should be applied, as explained in F. Bossen, "On general intra sample prediction", 15$^{th}$ JVET Meeting, Gothenburg, SE, July 2019, JVET-O0364. With this modification, the video coder applies PDPC for (x< (3<<nScale)) OR (y<(3<<nScale)), depending on whether the mode number is greater than 50 or less than 18. As a consequence, when (nScale<0) PDPC is not applied (which is shown in FIG. 3, for a given prediction direction 22 for bottom-left pixel 24 inside block 20), the diagonally opposite reference pixel is not available. Thus, using the conventional techniques of VVC, PDPC cannot be applied, even for the pixels in first column of the block.

FIG. 4 is a conceptual diagram illustrating graph 30 including nScale values as a function of a height of a transform block (nTbH) and a mode number that may be used when performing the techniques of this disclosure. For some prediction directions and block dimensions, PDPC is not applied for nScale<0. The nScale values for different prediction direction (indicated by mode number) and block dimension (e.g., transform block (TB) size) are shown in FIG. 4. This disclosure describes various alternative ways of computing PDPC, which may lead to better compression performance for those cases.

Figure 5:
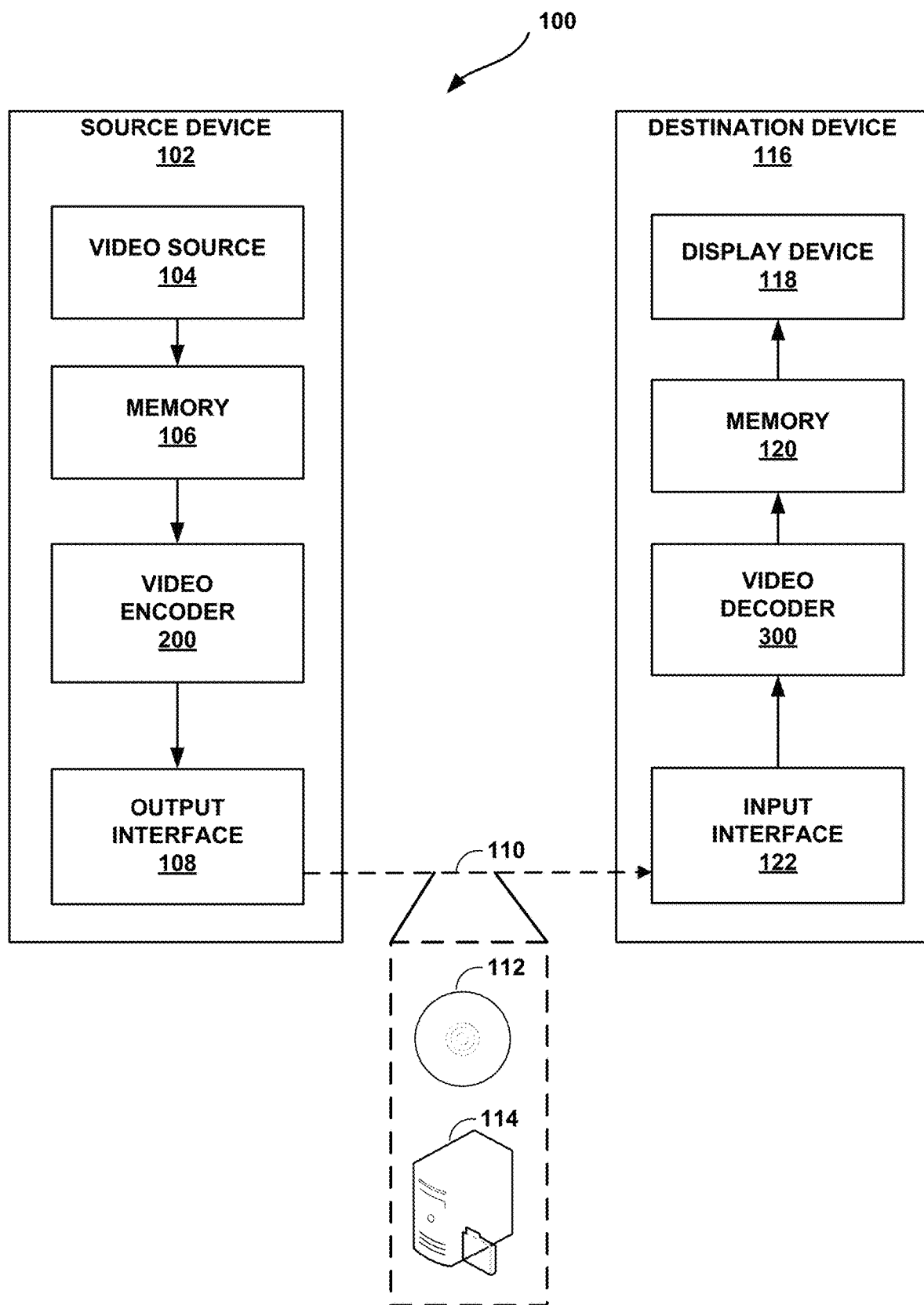
FIG. 5 is a block diagram illustrating an example video encoding and decoding system that may perform the techniques of this disclosure.

FIG. 5 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 5, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 5, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for performing position-dependent intra-prediction combination (PDPC) for angular intra-prediction modes. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 5 is merely one example. In general, any digital video encoding and/or decoding device may perform techniques for performing position-dependent intra-prediction combination (PDPC) for angular intra-prediction modes. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 include video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 5, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

In some examples, video encoder 200 (and similarly, video decoder 300) may perform position-dependent intra-prediction combination (PDPC) for a current block of video data. As discussed above, conventionally, PDPC includes combining a standard intra-predicted block with values from neighboring reference pixels (or samples) along the intra-prediction direction, e.g., from an opposite boundary. According to the techniques of this disclosure, in cases where PDPC cannot be applied conventionally due to reference pixels being outside of the PDPC range, video encoder 200 and video decoder 300 may alternatively compute PDPC for angular modes using "gradient PDPC." These techniques may generally be performed for two cases (although other cases may exist as well): Case 1 in which an intra-prediction mode is an upper-right angular intra-prediction mode (e.g., modes labeled 51-80 in FIG. 1, that is, modes greater than 50 and less than 81) and Case 2 in which the intra-prediction mode is a lower-right angular intra-prediction mode (e.g., modes labeled less than 18, excluding DC and planar modes (0 and 1, respectively) in FIG. 1). Gradient PDPC is explained in greater detail below with respect to FIG. 6.

In general, PDPC involves forming a prediction block for a current block using samples of a primary boundary and a secondary boundary. However, the two cases above represent angular modes for which samples of the secondary boundary are not available. Therefore, video encoder 200 and video decoder 300 may calculate a gradient term for one or more samples of the current block along a prediction direction (angle) for the intra-prediction modes. Video encoder 200 and video decoder 300 may then combine a value predicted using the primary boundary with the gradient term to form the predicted sample of a prediction block for the current block. Video encoder 200 and video decoder 300 may calculate the gradient term using a displacement value according to the angle of the corresponding intra-prediction mode. In some examples, video encoder 200 and video decoder 300 may weight the value predicted using the primary boundary and the gradient term, e.g., according to a distance between the position of the sample being predicted and a horizontally or vertically neighboring reference pixel.

Following prediction, such as intra-prediction using a gradient PDPC mode according to the techniques of this disclosure, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data. In some examples, video encoder 200 may encode, and video decoder 300 may decode, syntax data of a VPS, SPS, PPS, or other such data structure (e.g., a picture header, a slice header, a block header, or the like) related to gradient PDPC. For example, the syntax data may represent whether gradient PDPC is enabled, values used to determine angular intra-prediction modes for which gradient PDPC is enabled and to be used, or the like.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In VVC, CUs may be split using quadtree splitting, binary tree splitting, and/or center-side triple splitting. In each split (i.e., non-leaf) node of the binary tree, one flag may be signaled to indicate which splitting type (i.e., horizontal or vertical) is used, where 0 may indicate horizontal splitting and 1 may indicate vertical splitting. For quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of a QTBT structure and syntax elements (such as splitting information) for a prediction tree level of the QTBT structure. Video encoder 200 may encode, and video decoder 300 may decode, video data, such as prediction and transform data, for CUs represented by terminal leaf nodes of the QTBT structure.

In general, a CTU may be associated with parameters defining sizes of blocks corresponding to nodes of a QTBT structure at the first and second levels. These parameters may include a CTU size (representing a size of the CTU in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 6:
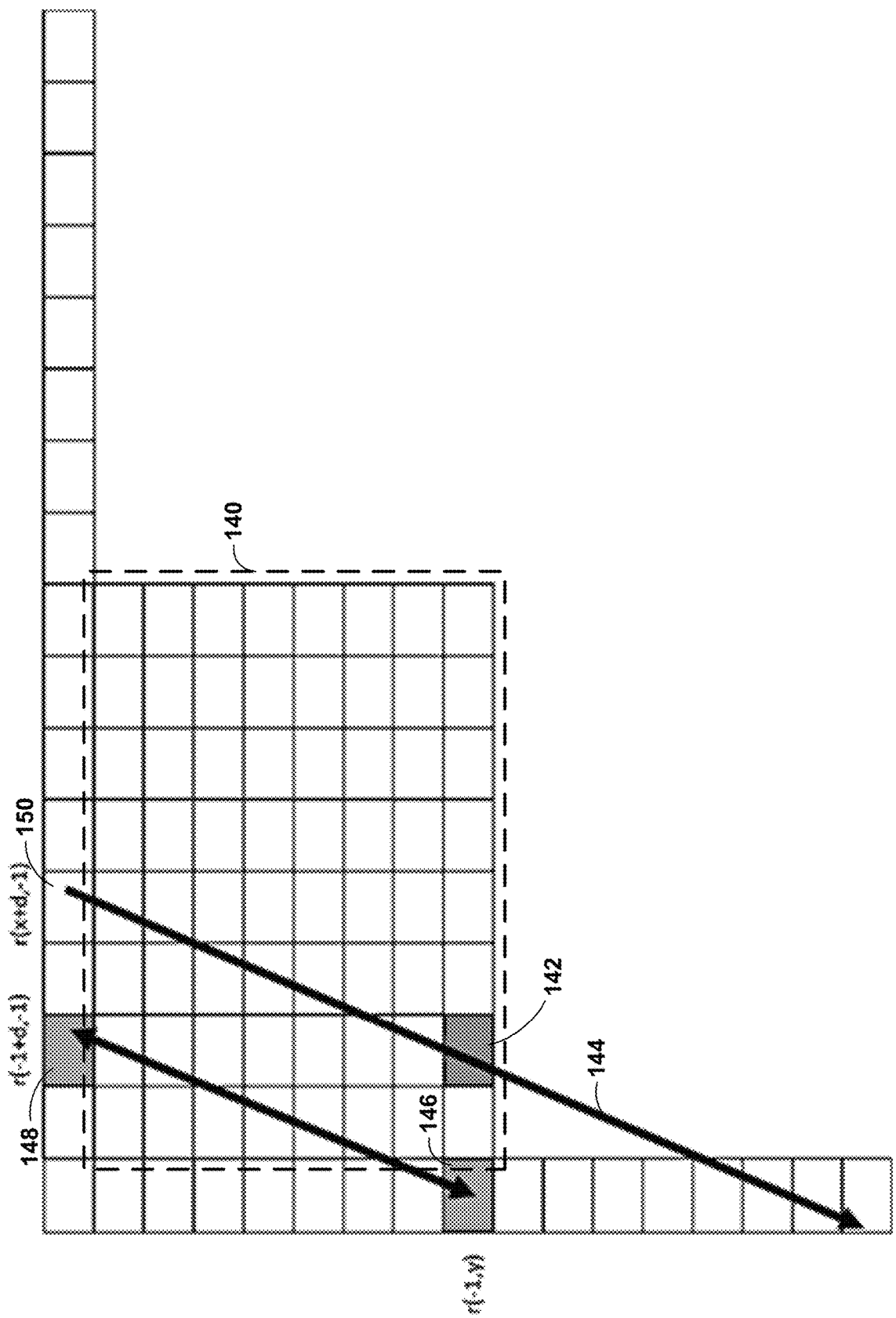
FIG. 6 is a conceptual diagram illustrating an example set of data that may be used to perform a gradient position-dependent intra-prediction combination (PDPC) for a given intra-prediction angle using the techniques of this disclosure.

FIG. 6 is a conceptual diagram illustrating an example set of data that may be used to perform a gradient position-dependent intra-prediction combination (PDPC) for a given intra-prediction angle using the techniques of this disclosure. FIG. 6 illustrates current block 140 including intra-prediction sample 142. To perform gradient PDPC, video encoder 200 or video decoder 300 may compute the intensity variation or "gradient" along the prediction direction, as shown by arrow 144 in FIG. 6 (for Case 1, i.e., an upper-right intra-prediction direction). For Case 1, for a sample at position (x,y) (e.g., intra-prediction sample 142), video encoder 200 and video decoder 300 may fetch a value of horizontally-aligned reference sample 146 (at position r(−1, y)), from the left reference line to current block 140. To compute the gradient along this prediction direction and offset (straight line with slope same as prediction direction and containing sample r(−1,y)), video encoder 200 and video decoder 300 may derive a value for the corresponding pixel in the top reference line, e.g., reference sample 148 (at position r(−1+d, −1) in FIG. 6).

Similarly, for Case 2, for a sample at position (x,y), video encoder 200 and video decoder 300 may fetch a value for a vertically aligned reference sample (at position r(x,−1)). To compute the gradient along this prediction direction and offset (straight line with slope being the same as the prediction direction and containing the sample at position r(x,−1)), video encoder 200 and video decoder 300 may derive the corresponding pixels in the left reference line, i.e., r(−1,−1+d).

As shown in FIG. 6, "d" indicates horizontal/x (for Case 1) or vertically (for Case 2) displacement compared to the other reference pixel (r(−1,y) for Case 1 or r(x,−1) for Case 2). VVC describes the process for calculating the value of d. Video encoder 200 and video decoder 300 may calculate the value of d prior to the original prediction process using the intra-prediction angle. "d" may have non-integer (fractional) values. In VVC, the values of "d" are derived in 1/32-pixel accuracy (so, for an integer pixel displacement, "d" may be a multiple of 32). Video encoder 200 and video decoder 300 may derive the integer (dInt) and fractional (dFrac) (in 1/32-pixel accuracy) pixel displacement using:

dInt=d>>5;

dFrac=d& 31.

Video encoder 200 and video decoder 300 may apply a variety of different techniques to calculate r(−1+d,−1) (for Case 1) or r(−1,−1+d) (for Case 2) for fractional pixel positions. Function Q(i) may refer to r(−1+i,−1) for Case 1 and r(−1,−1+i) for Case 2. To calculate Q(i), video encoder 200 and video decoder 300 may apply any of the following example techniques:
  a) Nearest integer pixel (rounding): Q(d)=Q(dRound), where dRound=(d+16)>>5.
  b) Linear interpolation (2 tap filtering): Q(d)=((32−dFrac)*Q(dInt)+dFrac*Q(dInt+1)+16)>>5.
  c) Cubic interpolation as in VVC (4 tap filtering): Q(d)=(fC[0]*Q[dInt−1]+fC[1]*Q[dInt]+fC[2]*Q[dInt+1]+fC[3]*Q[dInt+2]+32)>>6, where sum(fC[i])=64.
  d) Gaussian interpolation as in VVC (4 tap filtering): Val=(fG[0]*Q[dInt−1]+fG[1]*Q[dInt]+fG[2]*Q[dInt+1]+fG[3]*Q[dInt+2]+32)>>6, where sum(fG[i])=64.
  e) A combination of fC and fG, depending on the prediction direction and block dimension (identically the same or similar to what is used in reference pixel smoothing for intra-prediction in VVC).
  f) In general, any other finite tap filtering can also be used for interpolation.

For Case 1, video encoder 200 and video decoder 300 may calculate the gradient term as r(−1,y)−r(−1+d, −1). Similarly, for Case 2, video encoder 200 and video decoder 300 may calculate the gradient term as r(x,−1)−r(−1, −1+d).

For Case 1, video encoder 200 and video decoder 300 may calculate a weight value that depends on the distance between (x,y) and (−1,y), i.e., depending on the value of x. The weight value may be defined as wL[x], which can be exponentially decaying with respect to x. For example, video encoder 200 and video decoder 300 may calculate wL[x]=(a>>((x<<1)>>nScale2), where nScale2 can be derived as (floor(log 2(nTbH))+floor(log 2(nTbW))−2)>>2, the value of "a" can be a power of 2 and less than 64, such as 32, 16, 8, 4, etc. For Case 2, similarly, video encoder 200 and video decoder 300 may calculate weight wT(y), depending on the distance between (x,y) and (x, −1), as wT[y]=(a>>((y>>1)>>nScale2).

Video encoder 200 and video decoder 300 may calculate the final prediction signal (after PDPC application) as, for example:
  Case 1: Clip(((64−wL(x))*p(x,y)+wL(x)*(r(−1,y)−r(−1+d, −1))+32)>>6)
  Case 2: Clip(((64−wT(y))*p(x,y)+wT(y)*(r(x,−1)−r(−1, −1+d))+32)>>6)

Video encoder 200 and video decoder 300 may be configured to determine clipping ranges using a bitdepth (e.g., the bitdepth currently being processed). For example, for 10 bits, video encoder 200 and video decoder 300 may clip values to being between 0 and 1023 ($2^{10}$−1). In general, the clipping range may be ($2^{bitdepth}$−1).

Figure 7:
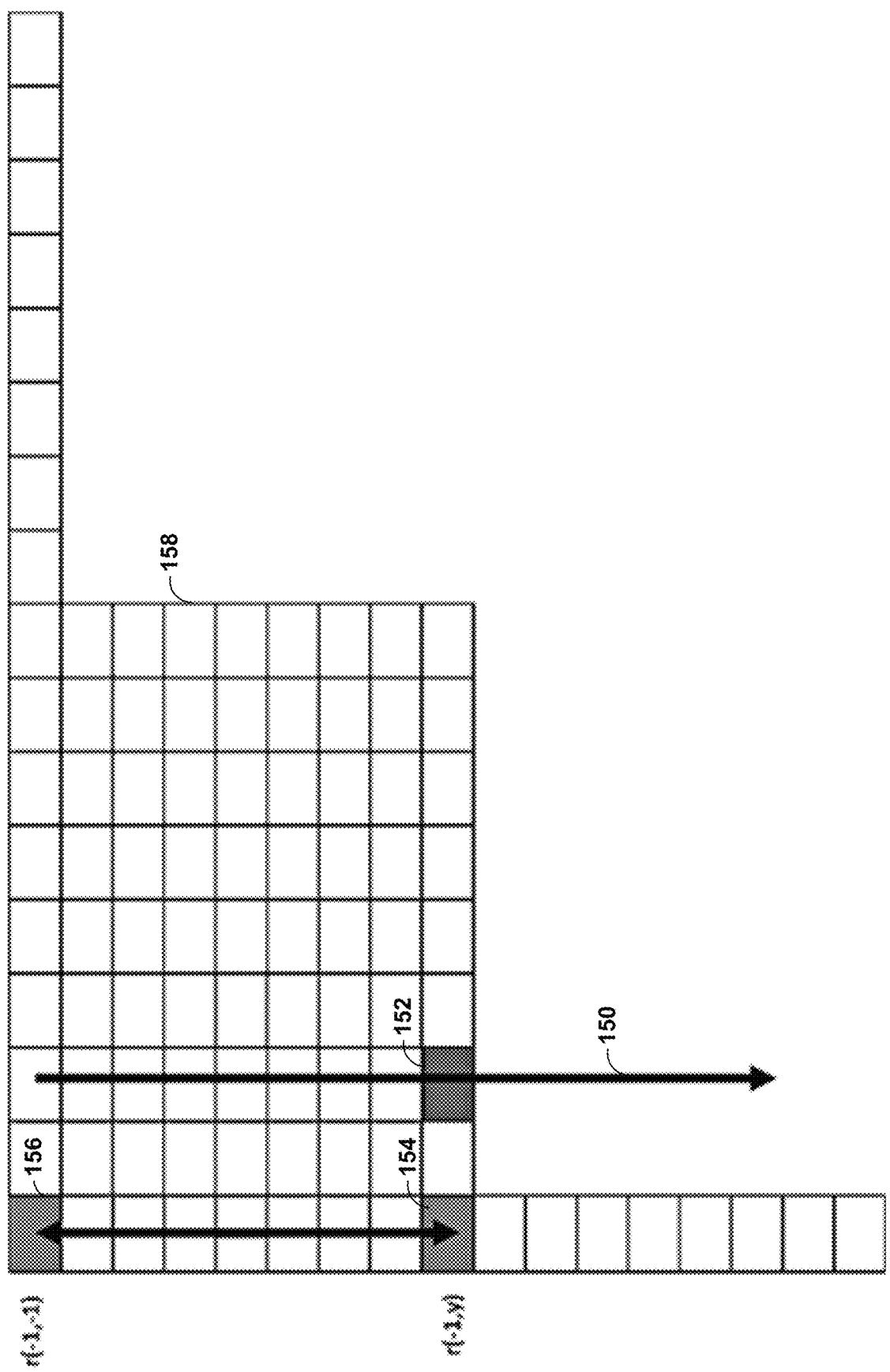
FIG. 7 is a conceptual diagram illustrating an example set of data that may be used for gradient position-dependent intra-prediction combination (PDPC) for vertical mode using the techniques of this disclosure.

FIG. 7 is a conceptual diagram illustrating an example set of data that may be used for gradient position-dependent intra-prediction combination (PDPC) for vertical intra-prediction mode 150 using the techniques of this disclosure. In this example, block 158 includes sample 152. This disclosure extends gradient PDPC to angular intra-prediction modes, contrasted with conventional PDPC. FIG. 7 illustrates an example of a special case in which d=0. Video encoder 200 or video decoder 300 may apply PDPC to predict sample 152 using, e.g., samples 154 and 156 that neighbor block 158, as discussed in greater detail below. Gradient PDPC may be applied for (x<(3<<nScale2)) for Case 1, and for (y<(3<<nScale2)) for Case 2, and the value of nScale2>=0 for all blocks, so PDPC can be applied (at least partially, for some rows/columns) for all such blocks. Also, the application of PDPC (range) may depend on nScale2. A higher value of nScale2 may indicate that PDPC can be applied for a greater number of rows/columns.

In some examples, video encoder 200 and video decoder 300 may apply gradient PDPC to blocks where nScale<0, or equivalently, to blocks where the original PDPC method of VVC cannot be applied. The corresponding specification changes to JVET-P2001-vE are shown below, where "[added: "added text"] represents additions relative to JVET-P2001-vE:

3.1.1.1  3.1.1.1.1  Position-Dependent Intra-Prediction Sample Filtering Process Inputs to this process are:
  the intra-prediction mode predModeIntra,
  a variable nTbW specifying the transform block width,
  a variable nTbH specifying the transform block height,
  a variable refW specifying the reference samples width,
  a variable refH specifying the reference samples height, the predicted samples predSamples[x][y], with
x=0 . . . nTbW−1, y=0 . . . nTbH−1,
the neighbouring samples p[x][y], with
x=−1, y=−1 . . . refH−1 and x=0 . . . refW−1, y=−1.
Outputs of this process are the modified predicted samples predSamples[x][y] with x=0 . . . nTbW−1, y=0 . . . nTbH−1.
The variable nScale is derived as follows:
If predModeIntra is greater than INTRA_ANGULAR50, nScale is set equal to Min(2, Log 2(nTbH)−Floor(Log 2(3*invAngle−2))+8), using invAngle as specified in clause 8.4.5.2.12.
Otherwise, if predModeIntra is less than INTRA_ANGULAR18, not equal to INTRA_PLANAR and not equal to INTRA_DC, nScale is set equal to Min(2, Log 2(nTbW)−Floor(Log 2(3*invAngle−2))+8), using invAngle as specified in clause 8.4.5.2.12.
[added: "The variable nScale2 is set to ((Log 2(nTbW)+Log 2(nTbH)−2)>>2)."]
The reference sample arrays mainRef[x] and sideRef[y], with x=0 . . . refW−1 and y=0 . . . refH−1 are derived as follows:

mainRef[x]=p[x][−1]

sideRef[y]=p[−1][y] (424)

The variables refL[x][y], refT[x][y], wT[y], and wL[x] with x=0 . . . nTbW−1, y=0 . . . nTbH−1 are derived as follows:
If predModeIntra is equal to INTRA_PLANAR or INTRA_DC, the following applies:

refL[x][y]=p[−1][y] (425)

refT[x][y]=p[x][−1] (426)

wT[y]=32>>((y<<1)>>[added: "nScale2"]) (427)

wL[x]=32>>((x<<1)>>[added: "nScale2"]) (428)

Otherwise, if predModeIntra is equal to INTRA_ANGULAR18 or INTRA_ANGULAR50 [added: "or nScale is less than 0"], the following applies:
[added: "The variable tempSample is derived, using iIdx and iFact as specified in clause 8.4.5.2.12, as follows:
If predModeIntra is less than or equal to INTRA_ANGULAR18, tempSample=((32−iFact)*p[−1][iIdx−1]+iFact*p[−1][iIdx]+16)>>5

Otherwise, tempSample=((32−iFact)*p[iIdx−1][−1]+iFact*p[iIdx][−1]+16)>>5 refL[x][y]=p[−1][y]−tempSample+predSamples[x][y] (429)

refT[x][y]=p[x][−1]tempSample+predSamples[x][y] (430)"]

wT[y]=(predModeIntra [added:"<="]INTRA_ANGULAR18)?32>>((y<<1)>>[added: "nScale2"]): 0 (431)

wL[x]=(predModeIntra [added: ">="]INTRA_ANGULAR50)?32>>((x<<1)>>[added: "nScale2"]): 0 (432)

Otherwise, if predModeIntra is less than INTRA_ANGULAR18, the following ordered steps apply:
1. The variables dXInt[y] and dX[x][y] are derived as follows using invAngle as specified in clause 8.4.5.2.12 depending on intraPredMode:

dXInt[y]=((y+1)*invAngle+256)>>9 (433)

dX[x][y]=x+dXInt[y]

2. The variables refL[x][y], refT[x][y], wT[y], and wL[x] are derived as follows:

refL[x][y]=0 (434)

refT[x][y]=(y<(3<<nScale))?mainRef[dX[x][y]]:0 (435)

wT[y]32>>((y<<1)>>nScale) (436)

wL[x]=0 (437)

Otherwise, if predModeIntra is greater than INTRA_ANGULAR50, the following ordered steps apply:
1. The variables dYInt[x] and dY[x][y] are derived as follows using invAngle as specified in clause 8.4.5.2.12 depending on intraPredMode:

dYInt[x]=((x+1)*invAngle+256)>>9 (8-243)

dY[x][y]=y+dYInt[x]

2. The variables refL[x][y], refT[x][y], wT[y], and wL[x] are derived as follows:

refL[x][y]=(x<(3<<nScale))?sideRef[dY[x][y]]:0 (439)

refT[x][y]=0 (440)

wT[y]=0 (441)

wL[x]32>>((x<<1)>>nScale) (442)

Otherwise, refL[x][y], refT[x][y], wT[y], and wL[x] are all set equal to 0.
The values of the modified predicted samples predSamples[x][y], with x=0 . . . nTbW−1, y=0 . . . nTbH−1 are derived as follows:

predSamples[x][y]=Clip1((refL[x][y]*wL[x]+refT[x][y]*wT[y]+(64−wL[x]−wT[y])*predSamples[x][y]+32)>>6). (443)

In some examples, video encoder 200 and video decoder 300 may apply gradient PDPC as discussed above to only near-horizontal and near-vertical modes, e.g., for modes 18−k1 and 50+k2, where 0<k1<=TH1, and 0<k2<=TH2. The threshold values (TH1, TH2) can be fixed or dependent on block size, quantization parameter, and/or other block parameters. TH1 and TH2 can also be specified at a picture level (e.g., in picture header or a picture parameter set (PPS)) or a sequence level parameter (e.g., in a sequence parameter set (SPS)). That is, video encoder 200 may encode data representing TH1 and TH2 in, e.g., a VPS, SPS, PPS, picture header, slice header, block header, or the like, and video decoder 300 may decode the data to determine TH1 and TH2, and likewise, k1 and k2.

Video encoder 200 and video decoder 300 may be configured to code a flag (e.g., a sequence level flag in an SPS or a picture level flag in a PPS) to enable/disable gradient PDPC. For example, video encoder 200 may perform rate-distortion optimization (RDO) to determine whether gradient PDPC reduces distortion without overly increasing bitrate, and if so, may enable gradient PDPC. Additionally or alternatively, video encoder 200 may enable gradient PDPC only for certain profiles, tiers, and/or levels of a relevant video coding standard.

In some examples, video encoder 200 and video decoder 300 may apply gradient PDPC to blocks where nScale<nScale2, or to blocks where gradient PDPC will be applied in more areas compared to original PDPC.

In some examples, when nScale<nScale2, video encoder 200 and video decoder 300 may apply original PDPC for (x<(3<<nScale)) and gradient PDPC for ((3<<nScale)<=x< ((3<<nScale2)), for Case 1. Similarly, for Case 2, video encoder 200 and video decoder 300 may apply original PDPC for (y<(3<<nScale)) and gradient PDPC for ((3<<nScale)<=y<((3<<nScale2)). In these examples, a motivation is to use "gradient PDPC" for the rows or columns, where original PDPC cannot be applied.

In some examples, video encoder 200 and video decoder 300 may combine the results of conventional PDPC and gradient PDPC, e.g., in a weighted manner, where both conventional PDPC and gradient PDPC can be applied.

In some examples, video encoder 200 and video decoder 300 may apply gradient PDPC for angular modes to luma components, but not to chroma components.

In some examples, gradient PDPC may be disabled (or not applied) for angular modes for narrow chroma blocks (e.g., chroma blocks of N×2 or 2×N). For example, video encoder 200 and video decoder 300 may determine that a chroma block is narrow (e.g., N×2 or 2×N) and based on the determination that the chroma block is narrow, not apply gradient PDPC for angular modes to that narrow block.

Video encoder 200 and video decoder 300 may apply any or all of the techniques discussed above alone or in any combination.

Figure 8:
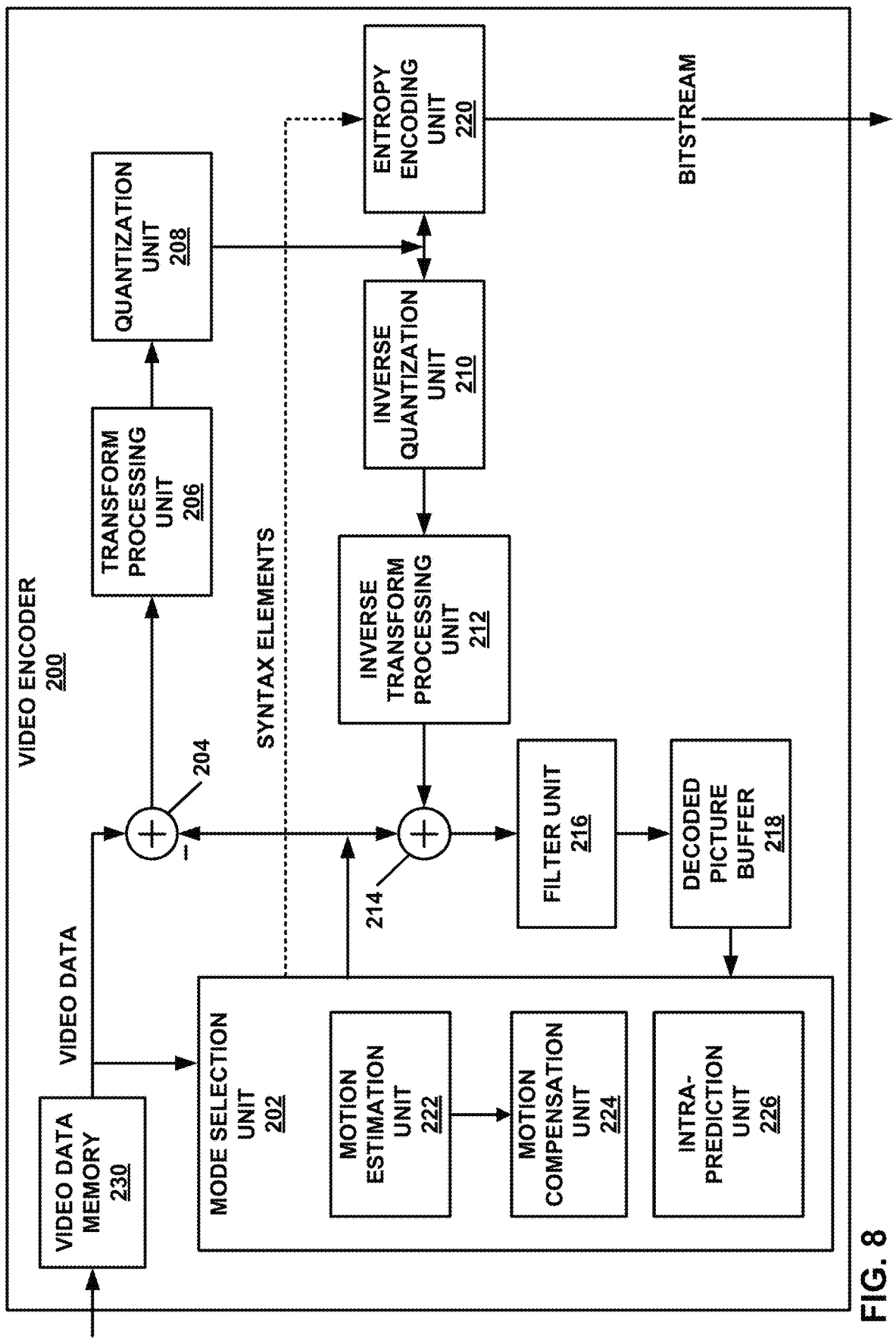
FIG. 8 is a block diagram illustrating an example video encoder that may perform the techniques of this disclosure.

FIG. 8 is a block diagram illustrating an example video encoder 200 that may perform the techniques of this disclosure. FIG. 8 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 8, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 5). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 5 may also provide temporary storage of outputs from the various units of video encoder 200.

The various units of FIG. 8 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 5) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Intra-prediction unit 226 may also perform the gradient PDPC techniques of this disclosure. Intra-prediction unit 226 may initially form a prediction block for a current block using an angular intra-prediction mode. Intra-prediction unit 226 may also determine that the angular intra-prediction mode is a mode between 50 and 81 or less than 18 other than 1 and 0. In response, intra-prediction unit 226 may perform gradient PDPC.

In particular, as discussed above, intra-prediction unit 226 may determine a prediction direction of the angular intra-prediction mode. Intra-prediction unit 226 may calculate a gradient term for a sample of the current block along the prediction direction. For example, intra-prediction unit 226 may calculate an intensity variation along the prediction direction, as discussed above, e.g., with respect to FIG. 6. Intra-prediction unit 226 may then combine the gradient term with the predicted value of the sample to form a final value for the sample. Intra-prediction unit 226 may perform these techniques for multiple samples (e.g., all samples or fewer than all samples) of the prediction block.

In some examples, when combining the gradient term with the predicted value, intra-prediction unit 226 may weight the gradient term and the predicted value, e.g., using weights having a combined sum of 1. Intra-prediction unit 226 may determine the weights based on, e.g., a distance between a position of a sample and a corresponding primary boundary (i.e., a boundary from which the predicted value was calculated). For example, when the intra-prediction mode is an upper-right angular intra-prediction mode, intra-prediction unit 226 may determine a weight to apply to the intra-predicted sample according to a distance between a position of the sample and a horizontally neighboring reference sample. As another example, when the intra-prediction mode is a lower-right angular intra-prediction mode, intra-prediction unit 226 may determine a weight to apply to the intra-predicted sample according to a distance between the position of the sample and a vertically neighboring reference sample.

In some examples, intra-prediction unit 226 may determine whether to apply gradient PDPC to the current block based on other factors beyond the angular intra-prediction direction used. For example, mode selection unit 202 may execute multiple encoding passes, comparing use of gradient PDPC to not using gradient PDPC for one or more blocks (e.g., multiple blocks in a slice, multiple slices, multiple pictures, etc.) Mode selection unit 202 may calculate rate-distortion optimization (RDO) values for each encoding pass and determine whether or not to enable gradient PDPC based on whether the RDO values when gradient PDPC is enabled are better than the RDO values when gradient PDPC is disabled.

In some examples (in addition or in the alternative to the above), intra-prediction unit 226 may calculate an nScale value and an nScale2 value for the current block as discussed above, and use these values to determine whether or not to apply gradient PDPC. For example, intra-prediction unit 226 may be configured to apply gradient PDPC to all blocks for which nScale2 is greater than or equal to zero. As another example, intra-prediction unit 226 may determine to apply gradient PDPC when nScale is less than nScale2. Additionally or alternatively, intra-prediction unit 226 may be configured to apply gradient PDPC only to luminance (luma) blocks, and not to chroma blocks. Additionally or alternatively, intra-prediction unit 226 may be configured to apply gradient PDPC only to blocks larger than 4×4.

In some examples, mode selection unit 202 may further encode explicit data representing whether gradient PDPC is enabled. For example, mode selection unit 202 may form a VPS, SPS, PPS, picture header, slice header, block header, or the like including data indicating whether gradient PDPC is enabled. Mode selection unit 202 may provide this data structure to entropy encoding unit 220 to be encoded as part of the bitstream.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra-prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as intra-block copy mode coding, affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generates syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device for encoding and decoding video data including a memory configured to store video data; and one or more processors implemented in circuitry and configured to: generate an intra-prediction block for a current block of video data using an angular intra-prediction mode, the angular intra-prediction mode being an upper-right angular intra-prediction mode or a lower-left angular intra-prediction mode; determine a prediction direction of the angular intra-prediction mode; for at least one sample of the prediction block for the current block: calculate a gradient term for the sample along the prediction direction; and combine a value of an intra-predicted sample of the intra-prediction block at a position of the sample of the prediction block with the gradient term to produce a value of the sample of the prediction block; and decode the current block using the prediction block.

Figure 9:
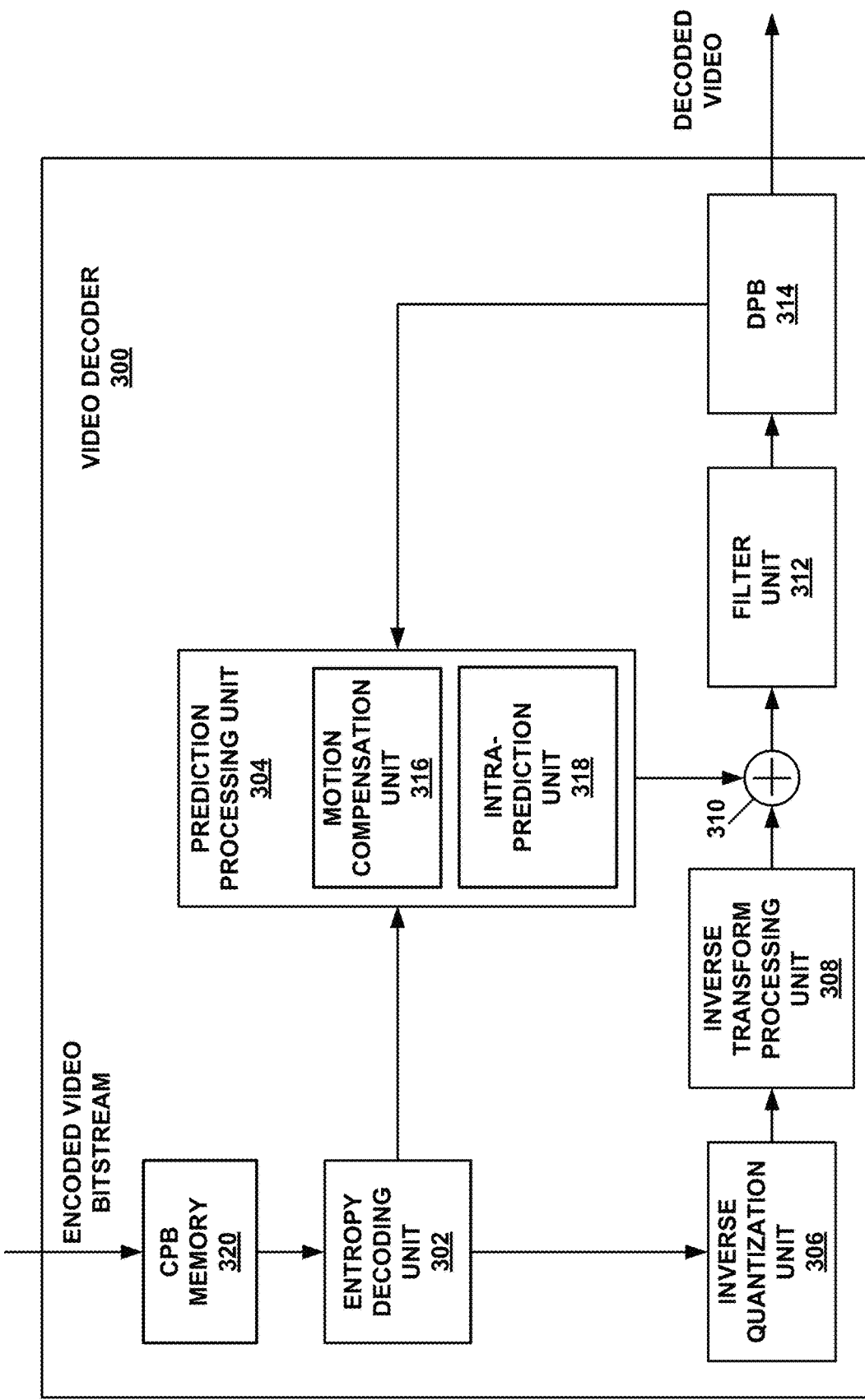
FIG. 9 is a block diagram illustrating an example video decoder that may perform the techniques of this disclosure.

FIG. 9 is a block diagram illustrating an example video decoder 300 that may perform the techniques of this disclosure. FIG. 9 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 9, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 5). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 5). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 9 are illustrated to assist with understanding the operations performed by video decoder 300. The units may be implemented as fixed-function circuits, programmable circuits, or a combination thereof. Similar to FIG. 8, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 8).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 8). Intra-prediction unit 318 may perform the gradient PDPC techniques of this disclosure. Intra-prediction unit 318 may retrieve data of neighboring samples to the current block from DPB 314.

In some examples, entropy decoding unit 302 may decode explicit data representing whether gradient PDPC is enabled. For example, entropy decoding unit 302 may decode a VPS, SPS, PPS, picture header, slice header, block header, or the like including data indicating whether gradient PDPC is enabled. Entropy decoding unit 302 may provide the decoded data to intra-prediction unit 318 indicating whether gradient PDPC is enabled for a particular sequence of pictures, picture, slice, block, or the like.

Intra-prediction unit 318 may perform the gradient PDPC techniques of this disclosure. Intra-prediction unit 318 may initially form a prediction block for a current block using an angular intra-prediction mode. Intra-prediction unit 318 may also determine that the angular intra-prediction mode is a mode between 50 and 81 or less than 18 other than 1 and 0. In response, intra-prediction unit 318 may perform gradient PDPC.

In particular, as discussed above, intra-prediction unit 318 may determine a prediction direction of the angular intra-prediction mode. Intra-prediction unit 318 may calculate a gradient term for a sample of the current block along the prediction direction. For example, intra-prediction unit 318 may calculate an intensity variation along the prediction direction, as discussed above, e.g., with respect to FIG. 6. Intra-prediction unit 318 may then combine the gradient term with the predicted value of the sample to form a final value for the sample. Intra-prediction unit 318 may perform these techniques for multiple samples (e.g., all samples or fewer than all samples) of the prediction block.

In some examples, when combining the gradient term with the predicted value, intra-prediction unit 318 may weight the gradient term and the predicted value, e.g., using weights having a combined sum of 1. Intra-prediction unit 318 may determine the weights based on, e.g., a distance between a position of a sample and a corresponding primary boundary (i.e., a boundary from which the predicted value was calculated). For example, when the intra-prediction mode is an upper-right angular intra-prediction mode, intra-prediction unit 318 may determine a weight to apply to the intra-predicted sample according to a distance between a position of the sample and a horizontally neighboring reference sample. As another example, when the intra-prediction mode is a lower-right angular intra-prediction mode, intra-prediction unit 318 may determine a weight to apply to the intra-predicted sample according to a distance between the position of the sample and a vertically neighboring reference sample.

In some examples, intra-prediction unit 318 may determine whether to apply gradient PDPC to the current block based on other factors beyond the angular intra-prediction direction used. As discussed above, intra-prediction unit 318 may receive data from entropy decoding unit 302 indicating whether gradient PDPC is enabled.

In some examples (in addition or in the alternative to the above), intra-prediction unit 318 may calculate an nScale value and an nScale2 value for the current block as discussed above, and use these values to determine whether or not to apply gradient PDPC. For example, intra-prediction unit 318 may be configured to apply gradient PDPC to all blocks for which nScale2 is greater than or equal to zero. As another example, intra-prediction unit 318 may determine to apply gradient PDPC when nScale is less than nScale2. Additionally or alternatively, intra-prediction unit 318 may be configured to apply gradient PDPC only to luminance (luma) blocks, and not to chroma blocks. Additionally or alternatively, intra-prediction unit 318 may be configured to apply gradient PDPC only to blocks larger than 4×4.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a device for decoding video data that includes a memory configured to store video data; and one or more processors implemented in circuitry and configured to: generate an intra-prediction block for a current block of video data using an angular intra-prediction mode, the angular intra-prediction mode being an upper-right angular intra-prediction mode or a lower-left angular intra-prediction mode; determine a prediction direction of the angular intra-prediction mode; for at least one sample of the prediction block for the current block: calculate a gradient term for the sample along the prediction direction; and combine a value of an intra-predicted sample of the intra-prediction block at a position of the sample of the prediction block with the gradient term to produce a value of the sample of the prediction block; and decode the current block using the prediction block.

Figure 10:
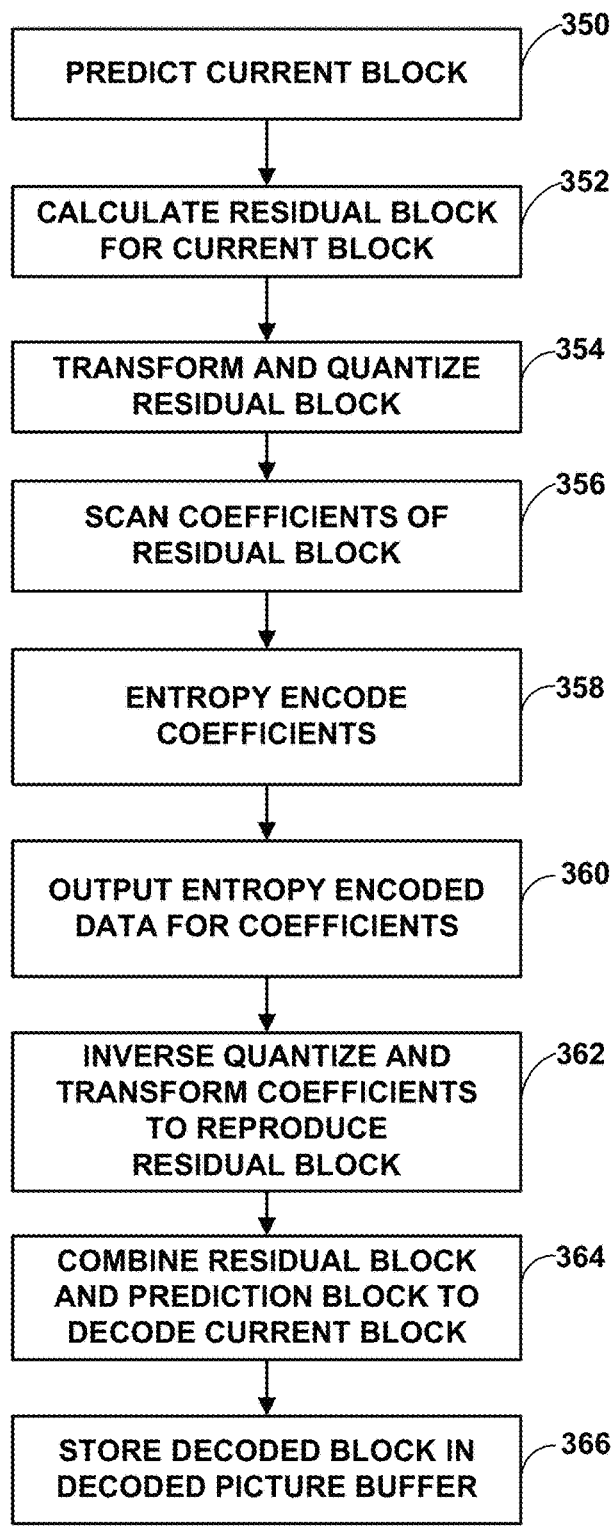
FIG. 10 is a flowchart illustrating an example method for encoding a current block in accordance with the techniques of this disclosure.

FIG. 10 is a flowchart illustrating an example method for encoding a current block in accordance with the techniques of this disclosure. The current block may comprise a current CU. Although described with respect to video encoder 200 (FIGS. 5 and 8), it should be understood that other devices may be configured to perform a method similar to that of FIG. 10.

In this example, video encoder 200 initially predicts the current block (350). For example, video encoder 200 may form a prediction block for the current block. In particular, video encoder 200 may form the prediction block using the gradient PDPC techniques of this disclosure. For example, video encoder 200 may determine a direction for an angular intra-prediction mode for the current block. Video encoder 200 may then, for at least one sample (but potentially multiple or all samples) of the current block, calculate gradient term(s) along the prediction direction and combine predicted values with the corresponding gradient terms to ultimately form the final prediction block for the current block.

Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

After encoding the current block, video encoder 200 may also decode the current block. As discussed above, video encoder 200 includes video decoding components, sometimes referred to as a decoding loop. These decoding components include inverse quantization unit 210, inverse transform processing unit 212, reconstruction unit 214, filter unit 216, and DPB 218 (FIG. 8). Thus, after encoding the current block, inverse quantization unit 210 and inverse transform processing unit 212 may inverse quantize and inverse transform the quantized transform coefficients to reproduce the residual block (362). Reconstruction unit 214 may then combine the residual block and the prediction block (on a sample-by-sample basis) to decode the current block (364). Video encoder 200 may then store the decoded block in DPB 218 (366). In some examples, filter unit 216 may filter the decoded block prior to storage in DPB 218. In this manner, video encoder 200 may both encode and decode the current block, such that reference blocks stored in DPB 218 are the same as decoded reference blocks reconstructed by a video decoder, such as video decoder 300.

In this manner, the method of FIG. 10 represents an example of a method of encoding and decoding video data including generating an intra-prediction block for a current block of video data using an angular intra-prediction mode, the angular intra-prediction mode being an upper-right angular intra-prediction mode or a lower-left angular intra-prediction mode; determining a prediction direction of the angular intra-prediction mode; for at least one sample of the prediction block for the current block: calculating a gradient term for the sample along the prediction direction; and combining a value of an intra-predicted sample of the intra-prediction block at a position of the sample of the prediction block with the gradient term to produce a value of the sample of the prediction block; and decoding the current block using the prediction block.

Figure 11:
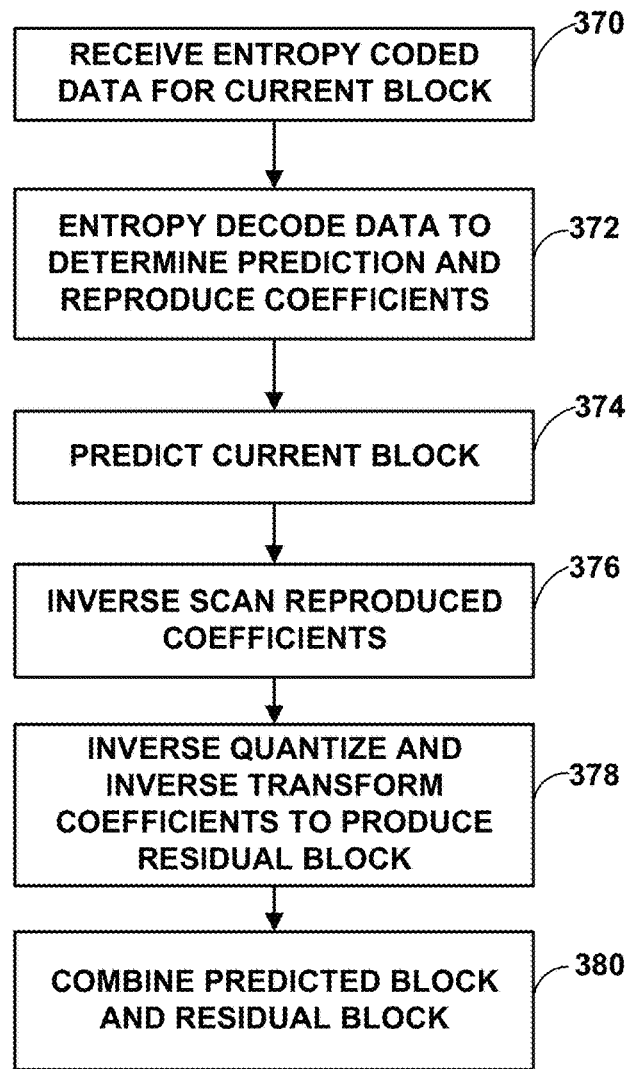
FIG. 11 is a flowchart illustrating an example method for decoding a current block in accordance with the techniques of this disclosure.

FIG. 11 is a flowchart illustrating an example method for decoding a current block in accordance with the techniques of this disclosure. The current block may comprise a current CU. Although described with respect to video decoder 300 (FIGS. 5 and 9), it should be understood that other devices may be configured to perform a method similar to that of FIG. 11.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block.

Video decoder 300 may form the prediction block using the gradient PDPC techniques of this disclosure. In particular, video decoder 300 may form the prediction block using the gradient PDPC techniques of this disclosure. For example, video decoder 300 may determine a direction for an angular intra-prediction mode for the current block. Video decoder 300 may then, for at least one sample (but potentially multiple or all samples) of the current block, calculate gradient term(s) along the prediction direction and combine predicted values with the corresponding gradient terms to ultimately form the final prediction block for the current block.

Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

In this manner, the method of FIG. 11 represents an example of a method of decoding video data including generating an intra-prediction block for a current block of video data using an angular intra-prediction mode, the angular intra-prediction mode being an upper-right angular intra-prediction mode or a lower-left angular intra-prediction mode; determining a prediction direction of the angular intra-prediction mode; for at least one sample of the prediction block for the current block: calculating a gradient term for the sample along the prediction direction; and combining a value of an intra-predicted sample of the intra-prediction block at a position of the sample of the prediction block with the gradient term to produce a value of the sample of the prediction block; and decoding the current block using the prediction block.

Figure 12:
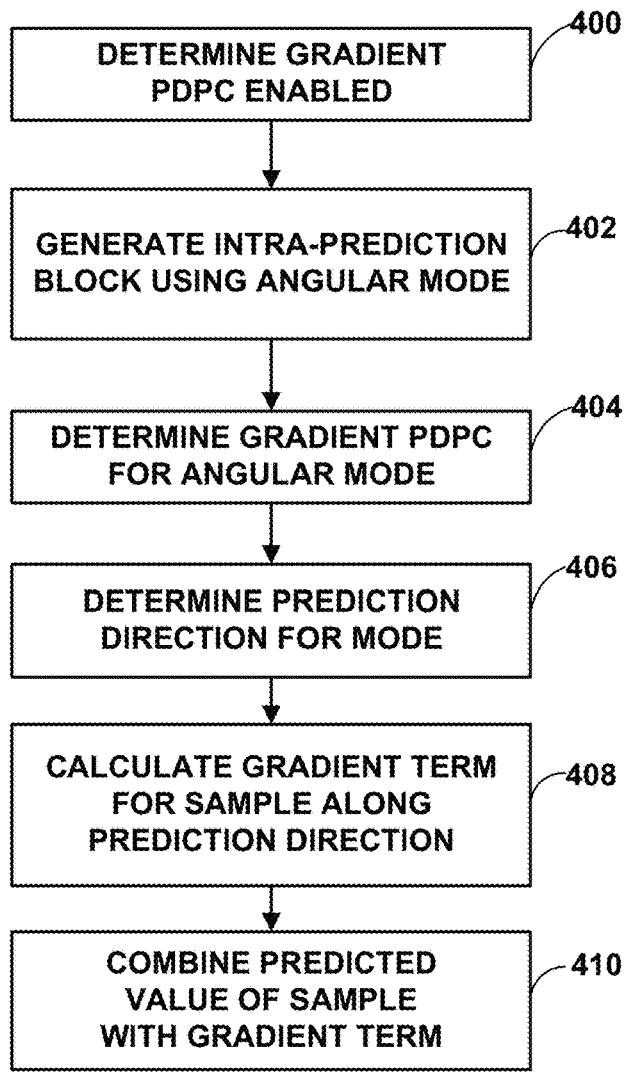
FIG. 12 is a flowchart illustrating an example method of predicting a block using gradient PDPC according to the techniques of this disclosure.

FIG. 12 is a flowchart illustrating an example method of predicting a block using gradient PDPC according to the techniques of this disclosure. For purposes of example and explanation, the method of FIG. 12 is explained with respect to video decoder 300 (FIGS. 5 and 9). However, it should be understood that other devices may perform this or a similar method, such as video encoder 200 of FIGS. 5 and 8. Video encoder 200 may perform the method of FIG. 12 as part of step 350 of the method of FIG. 10, while video decoder 300 may perform the method of FIG. 12 as part of step 374 of FIG. 11.

Video decoder 300 may initially determine that gradient PDPC is enabled (400). For example, video decoder 300 may decode syntax data, such as a VPS, SPS, PPS, picture header, slice header, block header, or the like, indicating that gradient PDPC is enabled for a corresponding unit of video data (entire video, sequence, picture, slice, block, etc.) Additionally or alternatively, video decoder 300 may determine to use gradient PDPC for a current block according to implicit data, such as a block size (e.g., being greater than 4×4 and/or not a thin block, such as 2×N or N×2), whether the current block is a luma block or a chroma block, nScale and nScale2 values for the current block, or the like.

Video decoder 300 may then generate an intra-prediction block using an angular intra-prediction mode (402). The angular intra-prediction mode may particularly be an upper-right angular intra-prediction mode or a lower-left angular intra-prediction mode. Upper-right angular intra-prediction modes may include modes having mode numbers greater than 50 and less than 81, while lower-left angular intra-prediction modes may include modes having mode numbers less than 18 but not 0 and 1. In some examples, video decoder 300 may determine that gradient PDPC is restricted to even fewer modes, e.g., using values of k1 and k2. For example, video decoder 300 may determine that upper-right angular intra-prediction modes have mode numbers greater than 50 and less than 50+k2, and that lower-left angular intra-prediction modes have mode numbers less than 18−k1. Video decoder 300 may further determine k1 and k2 from syntax data, from pre-configured data, or according to a size of the current block and/or a quantization parameter for the current block. Video decoder 300 may then determine that gradient PDPC applies for the angular intra-prediction mode (404).

Video decoder 300 may determine a prediction direction for the angular intra-prediction mode (406). Video decoder 300 may calculate a gradient term for a sample of the prediction block along the prediction direction (408). Video decoder 300 may then combine the predicted value of the sample with the gradient term (410) to produce a final value of the sample. Video decoder 300 may similarly update values of other samples of the prediction block using respective gradient terms.

In this manner, the method of FIG. 12 represents an example of a method of decoding video data, including generating an intra-prediction block for a current block of video data using an angular intra-prediction mode, the angular intra-prediction mode being an upper-right angular intra-prediction mode or a lower-left angular intra-prediction mode; determining a prediction direction of the angular intra-prediction mode; for at least one sample of the prediction block for the current block: calculating a gradient term for the sample along the prediction direction; and combining a value of an intra-predicted sample of the intra-prediction block at a position of the sample of the prediction block with the gradient term to produce a value of the sample of the prediction block; and decoding the current block using the prediction block.

Various techniques of this disclosure are summarized in the following clauses:

Clause 1: A method of coding video data, the method comprising: generating an intra-prediction block for a current block of video data using an angular intra-prediction mode, the angular intra-prediction mode being an upper-right angular intra-prediction mode or a lower-left angular intra-prediction mode; determining a prediction direction of the angular intra-prediction mode; for each sample of a prediction block of the current block: calculating a gradient term for the sample along the prediction direction; and combining a value of an intra-predicted sample of the intra-prediction block at a position of the sample of the prediction block with the gradient term to produce a value of the sample of the prediction block; and coding the current block using the prediction block.

Clause 2: The method of clause 1, wherein the angular intra-prediction mode comprises the upper-right angular intra-prediction mode having a mode number greater than 50 and less than 81.

Clause 3: The method of clause 1, wherein the angular intra-prediction mode comprises the lower-right angular intra-prediction mode having a mode number less than 18 and not being 0 or 1.

Clause 4: The method of any of clauses 1-3, further comprising, for each sample, calculating a displacement value using an angle of the angular intra-prediction mode, wherein calculating the gradient term comprises calculating the gradient term using the displacement value.

Clause 5: The method of clause 4, wherein d comprises the displacement value, (x,y) comprises the position of the sample, and calculating the gradient term comprises: when the angular intra-prediction mode is the upper-right angular intra-prediction mode, calculating the gradient term as being equal to $r(-1,y)-r(-1+d,-1)$; or when the angular intra-prediction mode is the lower-left angular intra-prediction mode, calculating the gradient term as being equal to $r(x,-1)-r(-1,-1+d)$, wherein $r(x',y')$ represents a reference sample of a current picture including the current block, the reference sample neighboring the current block in the current picture.

Clause 6: The method of any of clauses 1-5, wherein combining comprises applying a first weight to the value of the intra-predicted sample and a second weight to the gradient term.

Clause 7: The method of clause 6, further comprising: when the angular intra-prediction mode is the upper-right angular intra-prediction mode, determining the first weight according to a distance between the position of the sample and a position of a horizontally neighboring reference sample of a current picture including the current block; or when the angular intra-prediction mode is the lower-right angular intra-prediction mode, determining the first weight according to a distance between the position of the sample and a position of a vertically neighboring reference sample of the current picture.

Clause 8: The method of any of clauses 1-7, further comprising determining that an nScale value for the current block is less than zero.

Clause 9: The method of any of clauses 1-8, wherein the lower-left angular intra-prediction mode comprises a near lower-left angular intra-prediction mode having a mode number less than 18 and greater than 18−k1, the upper-right angular intra-prediction mode comprises a near upper-right angular intra-prediction mode having a mode number greater than 50 and less than 50+k2.

Clause 10: The method of clause 9, wherein k1 and k2 are fixed values.

Clause 11: The method of clause 9, further comprising calculating k1 and k2 according to at least one of a size of the current block or a quantization parameter for the current block.

Clause 12: The method of clause 9, further comprising coding parameter set data representing k1 and k2, the parameter set data comprising data of a sequence parameter set (SPS) or a picture parameter set (PPS).

Clause 13: The method of any of clauses 1-12, further comprising coding parameter set data enabling a gradient position-dependent intra-prediction (PDPC) mode for a current picture including the current block.

Clause 14: The method of any of clauses 1-13, further comprising determining that an nScale value for the current block is less than an nScale2 value for the current block.

Clause 15: The method of any of clauses 1-14, wherein the combining the value of the intra-predicted sample of the intra-prediction block at the position of the sample of the prediction block with the gradient term to produce the value of the sample of the prediction block is only performed for a luma component of the current block.

Clause 16: The method of any of clauses 1-15, wherein the combining the value of the intra-predicted sample of the intra-prediction block at the position of the sample of the prediction block with the gradient term to produce the value of the sample of the prediction block is not performed for a chroma component of the current block.

Clause 17: The method of any of clauses 1-16, further comprising: determining whether a chroma block of the current block is narrow; and based on the chroma block of the current block not being narrow, combining the value of the intra-predicted sample of the intra-prediction block at the position of the sample of the prediction block with the gradient term to produce the value of the sample of the prediction block.

Clause 18: The method of any of clauses 1-17, further comprising: determining whether a chroma block of the current block is narrow; and based on the chroma block of the current block being narrow, not combining the value of the intra-predicted sample of the intra-prediction block at the position of the sample of the prediction block with the gradient term to produce the value of the sample of the prediction block.

Clause 19: The method of any of clauses 1-18, wherein coding the current block comprises decoding the current block, comprising: decoding a residual block for the current block; and combining the prediction block with the residual block to produce a decoded version of the current block.

Clause 20: The method of any of clauses 1-19, wherein coding the current block comprises encoding the current block, comprising: calculating a residual block representing differences between the current block and the prediction block; and encoding the residual block.

Clause 21: A device for coding video data, the device comprising means for performing the method of any of clauses 1-18.

Clause 22: The device of clause 19, wherein the one or more means comprise one or more processors implemented in circuitry.

Clause 23: The device of clause 19, further comprising a display configured to display the video data.

Clause 24: The device of clause 19, wherein the device comprises one or more of a camera, a computer, a mobile device, a broadcast receiver device, or a set-top box.

Clause 25: The device of clause 17, further comprising a memory configured to store the video data.

Clause 26: A device for coding video data, the device comprising: means for generating an intra-prediction block for a current block of video data using an angular intra-prediction mode, the angular intra-prediction mode being an upper-right angular intra-prediction mode or a lower-left angular intra-prediction mode; means for determining a prediction direction of the angular intra-prediction mode; means for calculating a respective gradient term for each sample of a prediction block of the current block along the prediction direction; means for combining a value of an intra-predicted sample of the intra-prediction block at a position of each sample of the prediction block with the respective gradient term corresponding to the sample of the prediction block to produce a value of the sample of the prediction block; and means for coding the current block using the prediction block.

Clause 27: A computer-readable storage medium having stored thereon instructions that, when executed, cause a processor of a device for coding video data to perform the method of any of clauses 1-16. It is to be recognized that depending on the clause, certain acts or events of any of the techniques described herein can be performed in a different sequence, may be added, merged, or left out altogether (e.g., not all described acts or events are necessary for the practice of the techniques). Moreover, in certain clauses, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    generating an intra-prediction block for a current block of video data using an angular intra-prediction mode, the angular intra-prediction mode being an upper-right angular intra-prediction mode or a lower-left angular intra-prediction mode;
    determining that a secondary boundary sample of a secondary boundary for at least one sample of the intra-prediction block is not available according to position-dependent intra-prediction (PDPC) mode;
    in response to the secondary boundary sample not being available for the at least one sample:
        determining a prediction direction of the angular intra-prediction mode;
        for the at least one sample of the intra-prediction block for the current block:
            calculating a gradient term for the at least one sample along the intra-prediction direction using a sample of the secondary boundary that is available; and
            combining a value of an intra-predicted sample of the intra-prediction block at a position of the at least one sample of the intra-prediction block with the gradient term to produce a value of the at least one sample of the intra-prediction block; and
    decoding the current block using the intra-prediction block.

2. The method of claim 1, wherein the angular intra-prediction mode comprises the upper-right angular intra-prediction mode having a mode number greater than 50 and less than 81.

3. The method of claim 1, wherein the angular intra-prediction mode comprises the lower-right angular intra-prediction mode having a mode number less than 18 and not being 0 or 1.

4. The method of claim 1, further comprising, for the at least one sample, calculating a displacement value using an angle of the angular intra-prediction mode, wherein calculating the gradient term comprises calculating the gradient term using the displacement value.

5. The method of claim 4, wherein d comprises the displacement value, (x,y) comprises the position of the at least one sample, and calculating the gradient term comprises:
    when the angular intra-prediction mode is the upper-right angular intra-prediction mode, calculating the gradient term as being equal to r(−1,y)−r(−1+d,−1); or
    when the angular intra-prediction mode is the lower-left angular intra-prediction mode, calculating the gradient term as being equal to r(x,−1)−r(−1,−1+d),
    wherein r(x', y') represents a reference sample of a current picture including the current block at position (x', y'), the reference sample neighboring the current block in the current picture.

6. The method of claim 1, wherein combining comprises applying a first weight to the value of the intra-predicted sample and a second weight to the gradient term.

7. The method of claim 6, further comprising:
    when the angular intra-prediction mode is the upper-right angular intra-prediction mode, determining the first weight according to a distance between the position of the at least one sample and a position of a horizontally neighboring reference sample of a current picture including the current block; or
    when the angular intra-prediction mode is the lower-right angular intra-prediction mode, determining the first weight according to a distance between the position of the at least one sample and a position of a vertically neighboring reference sample of the current picture.

8. The method of claim 1, further comprising:
    calculating an nScale value for the current block, comprising calculating the nScale value according to Min (2, Log 2(nTbH)−Floor(Log 2(3*invAngle−2))+8), wherein nTbH represents a height of the current block and invAngle represents the prediction direction; and
    determining that the nScale value for the current block is less than zero.

9. The method of claim 1, wherein the lower-left angular intra-prediction mode comprises a near lower-left angular intra-prediction mode having a mode number less than 18 and greater than 18−k1, and the upper-right angular intra-prediction mode comprises a near upper-right angular intra-prediction mode having a mode number greater than 50 and less than 50+k2.

10. The method of claim 9, wherein k1 and k2 are fixed values.

11. The method of claim 9, further comprising calculating k1 and k2 according to at least one of a size of the current block or a quantization parameter for the current block.

12. The method of claim 9, further comprising decoding parameter set data representing k1 and k2, the parameter set data comprising data of a sequence parameter set (SPS) or a picture parameter set (PPS).

13. The method of claim 1, further comprising decoding parameter set data enabling a gradient position-dependent intra-prediction (PDPC) mode for a current picture including the current block.

14. The method of claim 1, wherein the current block comprises a luminance (luma) block.

15. The method of claim 1, wherein decoding the current block comprises:
    decoding a residual block for the current block; and
    combining the intra-prediction block with the residual block to produce a decoded version of the current block.

16. The method of claim 1, further comprising encoding the current block prior to decoding the current block, wherein encoding the current block comprises:
    calculating a residual block representing differences between the current block and the intra-prediction block; and
    encoding the residual block.

17. A device for decoding video data, the device comprising:
    a memory configured to store video data; and
    one or more processors implemented in circuitry and configured to:
        generate an intra-prediction block for a current block of video data using an angular intra-prediction mode, the angular intra-prediction mode being an upper-right angular intra-prediction mode or a lower-left angular intra-prediction mode;
        determine that a secondary boundary sample for at least one sample of the intra-prediction block is not available according to position-dependent intra-prediction (PDPC) mode;
        in response to the secondary boundary sample not being available for the at least one sample:
            determine a prediction direction of the angular intra-prediction mode;
            for the at least one sample of the intra-prediction block for the current block:
                calculate a gradient term for the at least one sample along the prediction direction using a sample of the secondary boundary that is available; and
                combine a value of an intra-predicted sample of the intra-prediction block at a position of the at least one sample of the intra-prediction block with the gradient term to produce a value of the at least one sample of the intra-prediction block; and
        decode the current block using the intra-prediction block.

18. The device of claim 17, wherein the angular intra-prediction mode comprises the upper-right angular intra-prediction mode having a mode number greater than 50 and less than 81.

19. The device of claim 17, wherein the angular intra-prediction mode comprises the lower-right angular intra-prediction mode having a mode number less than 18 and not being 0 or 1.

20. The device of claim 17, wherein the one or more processors are further configured to, for the at least one sample, calculate a displacement value using an angle of the angular intra-prediction mode, wherein the one or more processors are configured to calculate the gradient term using the displacement value.

21. The device of claim 20, wherein d comprises the displacement value, (x,y) comprises the position of the at least one sample, and the one or more processors are configured to calculate the gradient term according to:
    when the angular intra-prediction mode is the upper-right angular intra-prediction mode, calculate the gradient term as being equal to r(−1,y)−r(−1+d,−1); or
    when the angular intra-prediction mode is the lower-left angular intra-prediction mode, calculate the gradient term as being equal to r(x,−1)−r(−1,−1+d),
    wherein r(x',y') represents a reference sample of a current picture including the current block at position (x', y'), the reference sample neighboring the current block in the current picture.

22. The device of claim 17, wherein the one or more processors are configured to apply a first weight to the value of the intra-predicted sample and a second weight to the gradient term.

23. The device of claim 22, wherein the one or more processors are further configured to:
    when the angular intra-prediction mode is the upper-right angular intra-prediction mode, determine the first weight according to a distance between the position of the at least one sample and a position of a horizontally neighboring reference sample of a current picture including the current block; or
    when the angular intra-prediction mode is the lower-right angular intra-prediction mode, determine the first weight according to a distance between the position of the at least one sample and a position of a vertically neighboring reference sample of the current picture.

24. The device of claim 17, wherein the one or more processors are further configured to:
    calculate an nScale value for the current block, comprising calculating the nScale value according to Min(2, Log 2(nTbH)−Floor(Log 2(3*invAngle−2))+8), wherein nTbH represents a height of the current block and invAngle represents the prediction direction; and
    determine that the nScale value for the current block is less than zero.

25. The device of claim 17, wherein the lower-left angular intra-prediction mode comprises a near lower-left angular intra-prediction mode having a mode number less than 18 and greater than 18−k1, and the upper-right angular intra-prediction mode comprises a near upper-right angular intra-prediction mode having a mode number greater than 50 and less than 50+k2.

26. The device of claim 17, wherein the one or more processors are further configured to decode parameter set data enabling a gradient position-dependent intra-prediction (PDPC) mode for a current picture including the current block.

27. The device of claim 17, further comprising a display configured to display the video data.

28. The device of claim 17, wherein the device comprises one or more of a camera, a computer, a mobile device, a broadcast receiver device, or a set-top box.

29. A computer-readable storage medium having stored thereon instructions that, when executed, cause processor to:
- generate an intra-prediction block for a current block of video data using an angular intra-prediction mode, the angular intra-prediction mode being an upper-right angular intra-prediction mode or a lower-left angular intra-prediction mode;
- determine that a secondary boundary sample for at least one sample of the intra-prediction block is not available according to position-dependent intra-prediction (PDPC) mode;
- in response to the secondary boundary sample not being available for the at least one sample:
  - determine a prediction direction of the angular intra-prediction mode;
  - for the at least one sample of the intra-prediction block for the current block:
    - calculate a gradient term for the at least one sample along the prediction direction using a sample of the secondary boundary that is available; and
    - combine a value of an intra-predicted sample of the intra-prediction block at a position of the at least one sample of the intra-prediction block with the gradient term to produce a value of the at least one sample of the intra-prediction block; and
- decode the current block using the intra-prediction block.

* * * * *